US 8,739,555 B2

(12) United States Patent
Jung et al.

(10) Patent No.: US 8,739,555 B2
(45) Date of Patent: Jun. 3, 2014

(54) ROTARY TYPE ULTRALOW TEMPERATURE REFRIGERANT SUPPLY APPARATUS

(75) Inventors: Je heon Jung, Changwon-si (KR); Jung hyun Lee, Changwon-si (KR); Woon sik Kwon, Changwon-si (KR); Heui joo Park, Gimhae-si (KR); Chi whan Lee, Dongnae-gu (KR); Yeong chun Kim, Changwon-si (KR)

(73) Assignee: Doosan Heavy Industries & Construction Co., Ltd., Changwon-si (KR)

( * ) Notice: Subject to any disclaimer, the term of this patent is extended or adjusted under 35 U.S.C. 154(b) by 880 days.

(21) Appl. No.: 12/401,875

(22) Filed: Mar. 11, 2009

(65) Prior Publication Data

US 2010/0058790 A1    Mar. 11, 2010

(30) Foreign Application Priority Data

Sep. 9, 2008 (KR) .................. 10-2008-0088796

(51) Int. Cl.
*F25B 9/00* (2006.01)
*B01D 8/00* (2006.01)

(52) U.S. Cl.
USPC ................................ 62/6; 62/55.5

(58) Field of Classification Search
USPC ............... 310/52, 54, 56–61; 62/6, 55, 505
See application file for complete search history.

(56) References Cited

U.S. PATENT DOCUMENTS

| 3,626,717 | A  | * | 12/1971 | Lorch ............... 62/505 |
| 3,991,588 | A  | * | 11/1976 | Laskaris .......... 62/50.7 |
| 4,101,793 | A  | * | 7/1978  | Berthet et al. ....... 310/52 |
| 6,412,289 | B1 | * | 7/2002  | Laskaris et al. ..... 62/50.7 |
| 7,049,717 | B2 | * | 5/2006  | Frank et al. ......... 310/61 |
| 7,240,496 | B2 | * | 7/2007  | Frank et al. ........ 62/51.1 |
| 2006/0082228 | A1 | * | 4/2006 | Urbahn et al. ...... 310/52 |
| 2006/0113851 | A1 | * | 6/2006 | Ishihara et al. ..... 310/52 |
| 2007/0296287 | A1 | * | 12/2007 | Okazaki et al. ..... 310/64 |

OTHER PUBLICATIONS

U.S. Appl. No 12/402,146, filed Mar 11, 2009, Kwon et al.

* cited by examiner

*Primary Examiner* — Frantz Jules
*Assistant Examiner* — Keith Raymond
(74) *Attorney, Agent, or Firm* — Sughrue Mion, PLLC

(57) ABSTRACT

The rotary type ultralow temperature refrigerant supply apparatus includes a refrigerant introduction pipe coupled to the super conductive rotor for supplying a liquid-phase ultralow temperature refrigerant cooled by the refrigeration system to the evaporator, a refrigerant withdrawal pipe disposed spaced apart from the refrigerant introduction pipe for withdrawing a gas-phase ultralow temperature refrigerant obtained through the evaporation of the liquid-phase refrigerant by the evaporator and guiding the withdrawn gas-phase ultralow temperature refrigerant to the refrigeration system, and a vacuum housing fixedly disposed outside the refrigerant introduction pipe and the refrigerant withdrawal pipe, the vacuum housing having a vacuum heat insulation space defined inside.

16 Claims, 3 Drawing Sheets

US 8,739,555 B2

ROTARY TYPE ULTRALOW TEMPERATURE REFRIGERANT SUPPLY APPARATUS

BACKGROUND OF THE INVENTION

1. Field of the Invention

The present invention relates to a rotary type ultralow temperature refrigerant supply apparatus, and, more particularly, to a rotary type ultralow temperature refrigerant supply apparatus that is capable of separately forcibly circulating a liquid-phase ultralow temperature refrigerant supplied from a refrigeration system and a gas-phase ultralow temperature refrigerant obtained through the evaporation of the liquid-phase ultralow temperature refrigerant by an evaporator.

2. Description of the Related Art

Generally, super conductivity is called a phenomenon in which the electric resistance of a specific material reaches 0 under a certain temperature. A super conductor causes super conductivity at an ultralow temperature state in which the temperature is normally very low.

In particular, a super conductive rotor formed by winding a super conductor in the shape of a coil is used in electric generator and electric motor fields using such a super conductor. For the super conductivity, it is essentially required for the super conductive rotor to be maintained in an ultralow temperature state. Consequently, a cooling apparatus is also essentially required.

A rotary type ultralow temperature refrigerant supply apparatus, which is an example of the cooling apparatus, is an apparatus that supplies an ultralow temperature refrigerant from a refrigeration system in a stoppage state to a super conductive rotor in a rotation state. As shown in FIG. 3, a conventional rotary type ultralow temperature refrigerant supply apparatus 300 is installed between a super conductive rotor 200 including an evaporator 202 formed in a rotary shaft 201 and a plurality of super conductive coils 203 coupled to the outer circumference of the rotary shaft 201 and a refrigeration system 100 configured to supply an ultralow temperature refrigerant for supplying the ultralow temperature refrigerant into the evaporator 201 formed in the super conductive rotor 200 and discharging the ultralow temperature refrigerant from the evaporator 201 while maintaining the heat insulation state of the ultralow temperature refrigerant.

In particular, the conventional rotary type ultralow temperature refrigerant supply apparatus 300 as described above includes a refrigerant introduction pipe 301, a heat insulation casing 302 configured to thermally insulate the refrigerant introduction pipe 301 in a vacuum state, and a magnetic fluid seal 303 disposed between the heat insulation casing 302 in a stoppage state and the super conductive rotor 200 in a rotation state for sealing a gas-phase ultralow temperature refrigerant.

Consequently, an ultralow temperature refrigerant liquefied by the refrigeration system 100 is supplied into the evaporator 202 in the super conductive rotor 200 along the refrigerant introduction pipe 301 by virtue of gravity. The liquid-phase ultralow temperature refrigerant is evaporated, by the evaporator 202, into a gas-phase ultralow temperature refrigerant. The gas-phase ultralow temperature refrigerant moves to the refrigeration system 100 along the refrigerant introduction pipe 301. At this time, the liquid-phase ultralow temperature refrigerant and the gas-phase ultralow temperature refrigerant flow along the refrigerant introduction pipe 301 in opposite directions.

However, such a natural circulation type refrigerant supply apparatus supplies the liquid-phase ultralow temperature refrigerant only to a position lower than the refrigerant introduction pipe due to its characteristic using gravity. For this reason, the diameter of the super conductive rotor 200 is increased, and therefore, the diameter of the evaporator is increased. In this structure, the distance between a liquid contact part contacting the refrigerant and a liquid non-contact part not contacting the refrigerant in the evaporator increases, with the result that it is not possible to obtain a uniform cooling property of the super conductive rotor.

SUMMARY OF THE INVENTION

Therefore, the present invention has been made in view of the above problems, and it is an object of the present invention to provide a rotary type ultralow temperature refrigerant supply apparatus that is capable of separately forcibly circulating a liquid-phase ultralow temperature refrigerant supplied from a refrigeration system and a gas-phase ultralow temperature refrigerant obtained through the evaporation of the liquid-phase ultralow temperature refrigerant by an evaporator.

It is another object of the present invention to provide a rotary type ultralow temperature refrigerant supply apparatus that is capable of preventing the liquid-phase ultralow temperature refrigerant from concentrating at one side by a centrifugal force during the rotation of the super conductive rotor and thus minimizing the lowering in flow velocity of the liquid-phase ultralow temperature refrigerant.

It is another object of the present invention to provide a rotary type ultralow temperature refrigerant supply apparatus that is capable of rapidly discharging the gas-phase ultralow temperature refrigerant, obtained through the evaporation of the liquid-phase ultralow temperature refrigerant by the evaporator, from the evaporator and, at the same time, smoothly withdrawing the discharged gas-phase ultralow temperature refrigerant to the refrigeration system.

It is another object of the present invention to provide a rotary type ultralow temperature refrigerant supply apparatus that is capable of preventing the leakage of the refrigerant between the rotatable refrigerant introduction pipe and the stationary refrigeration system.

It is a further object of the present invention to provide a rotary type ultralow temperature refrigerant supply apparatus that is capable of preventing the leakage of the gas-phase ultralow temperature refrigerant introduced into a refrigerant withdrawal chamber.

In accordance with the present invention, the above and other objects can be accomplished by the provision of a rotary type ultralow temperature refrigerant supply apparatus coupled between a refrigeration system configured to supply an ultralow temperature refrigerant and a super conductive rotor for supplying an ultralow temperature refrigerant to an evaporator formed inside the super conductive rotor and withdrawing the ultralow temperature refrigerant from the evaporator, the rotary type ultralow temperature refrigerant supply apparatus including: a refrigerant introduction pipe coupled to the super conductive rotor, such that the refrigerant introduction pipe can rotate with the super conductive rotor, for supplying a liquid-phase ultralow temperature refrigerant cooled by the refrigeration system to the evaporator; at least one refrigerant withdrawal pipe disposed spaced apart from the refrigerant introduction pipe for withdrawing a gas-phase ultralow temperature refrigerant obtained through the evaporation of the liquid-phase ultralow temperature refrigerant by the evaporator and guiding the withdrawn gas-phase ultralow temperature refrigerant to the refrigeration system, the at least one refrigerant withdrawal pipe being configured to rotate with the refrigerant introduction pipe; and a vacuum housing fixedly disposed outside the refrigerant introduction pipe and the at least one refrigerant withdrawal pipe, the vacuum housing having a vacuum heat insulation space defined inside.

The refrigerant introduction pipe may be disposed at the same center of rotation as the super conductive rotor.

The at least one refrigerant withdrawal pipe may include a plurality of refrigerant withdrawal pipes disposed around the refrigerant introduction pipe in the form of a circle at predetermined intervals, and the rotary type ultralow temperature refrigerant supply apparatus may further include a refrigerant withdrawal chamber disposed between the refrigerant withdrawal pipes and the refrigeration system for temporarily storing the gas-phase ultralow temperature refrigerant withdrawn through the refrigerant withdrawal pipes.

The rotary type ultralow temperature refrigerant supply apparatus may further include: a connection pipe fixedly connected to the refrigeration system for supplying a liquid-phase ultralow temperature refrigerant from the refrigeration system; and a mechanical seal disposed inside the refrigerant withdrawal chamber for achieving sealing between the refrigerant introduction pipe and the connection pipe.

The rotary type ultralow temperature refrigerant supply apparatus may further include a magnetic fluid seal configured to achieve sealing among the rotatable refrigerant introduction pipe, the rotatable refrigerant withdrawal pipe(s), and the stationary vacuum housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, an exemplary embodiment of the present invention will be described in detail with reference to the accompanying drawings.

Figure 1:
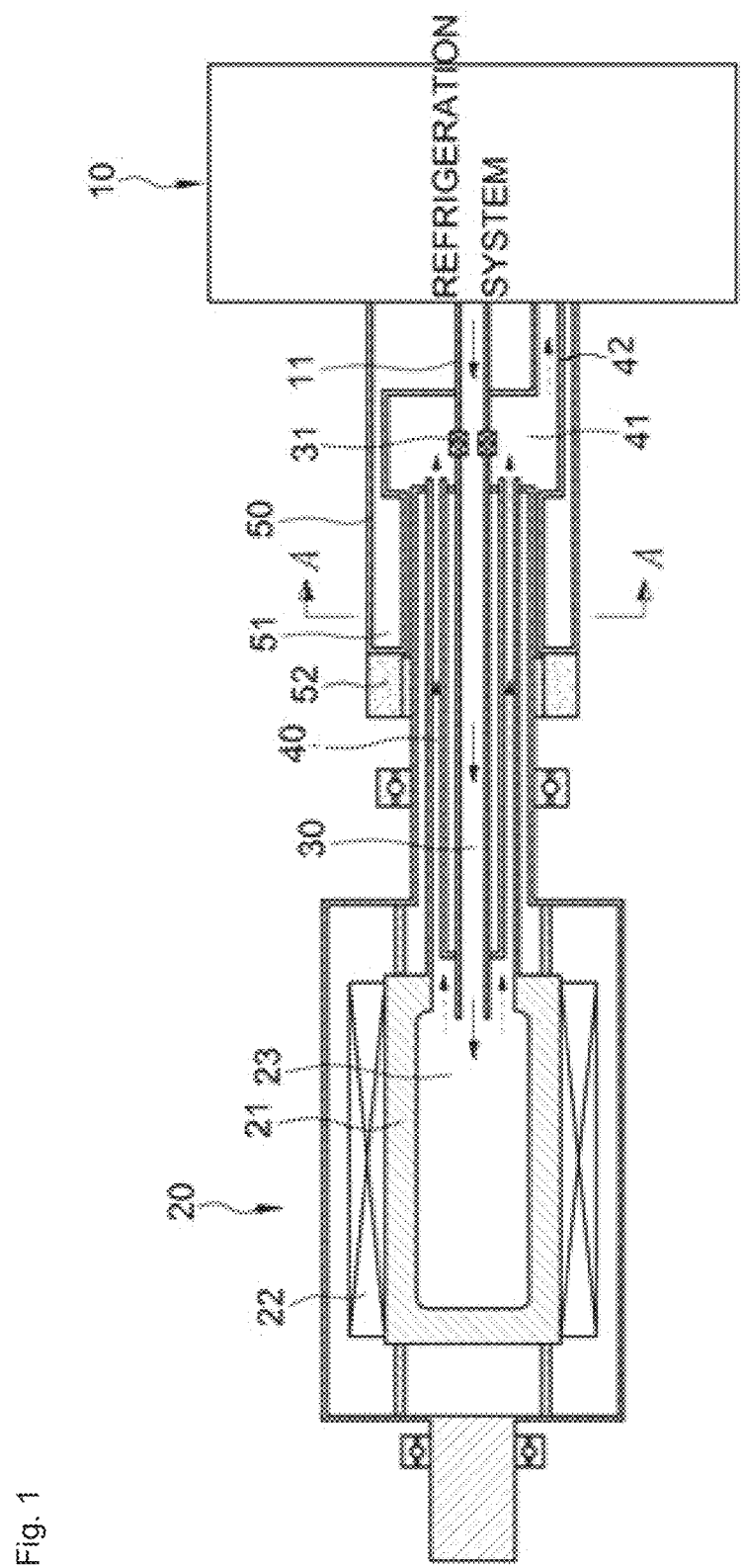
FIG. 1 is a longitudinal sectional view illustrating a rotary type ultralow temperature refrigerant supply apparatus according to an embodiment of the present invention.
Figure 2:
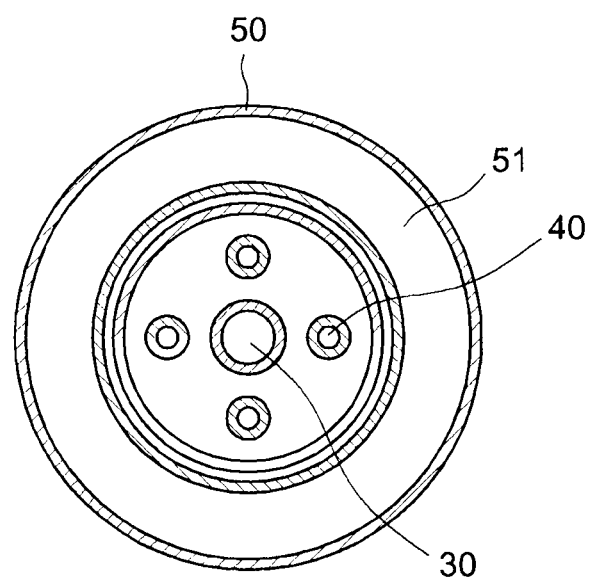
FIG. 2 is a sectional view taken along line A-A of FIG. 1.
Figure 3:
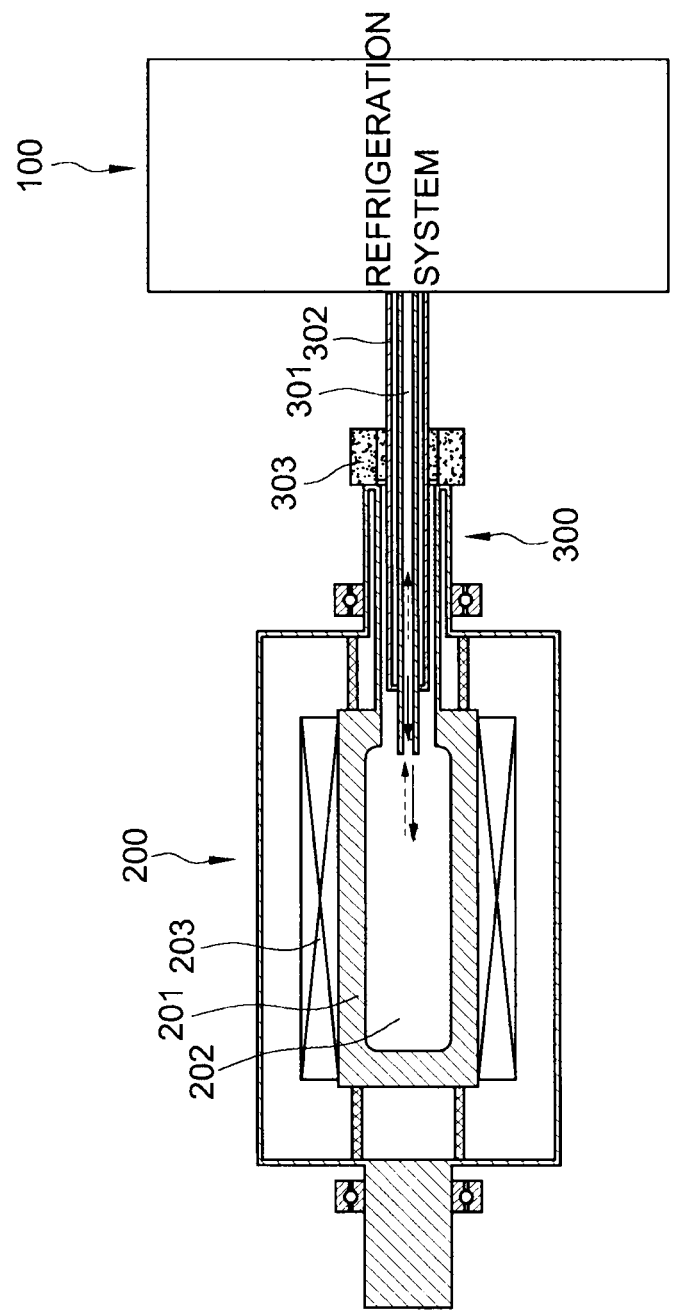
FIG. 3 is a longitudinal sectional view schematically illustrating an example of a conventional rotary type ultralow temperature refrigerant supply apparatus.

FIG. 1 is a longitudinal sectional view illustrating a rotary type ultralow temperature refrigerant supply apparatus according to an embodiment of the present invention, and FIG. 2 is a sectional view taken along line A-A of FIG. 1. As shown in FIGS. 1 and 2, the rotary type ultralow temperature refrigerant supply apparatus is installed between a refrigeration system 10 configured to supply an ultralow temperature refrigerant and a super conductive rotor 20 configured to be used in a super conductive electric generator or a super conductive electric motor, such that the rotary type ultralow temperature refrigerant supply apparatus can rotate with the super conductive rotor 20, for smoothly supplying the ultralow temperature refrigerant from the refrigeration system 10 to an evaporator 23 formed in the super conductive rotor 20 and, at the same time, withdrawing a gas-phase ultralow temperature refrigerant obtained by the evaporation in the evaporator 23 to the refrigeration system 10. The rotary type ultralow temperature refrigerant supply apparatus includes a refrigerant introduction pipe 30 configured to allow a liquid-phase ultralow temperature refrigerant to flow to the evaporator 23 therealong, a refrigerant withdrawal pipe 40 configured to allow a gas-phase ultralow temperature refrigerant to flow to the refrigeration system 10 therealong, and a vacuum housing 50 configured to thermally insulate the refrigerant introduction pipe 30 and the refrigerant withdrawal pipe 40 in a vacuum state.

The refrigeration system 10 supplies a liquid-phase ultralow temperature refrigerant to the evaporator 23 of the super conductive rotor 20, which will be described below, and withdraws and cools a gas-phase ultralow temperature refrigerant obtained through the evaporation of the liquid-phase ultralow temperature refrigerant by the evaporator 23. The refrigeration system 10 is constructed to forcibly feed a liquid-phase ultralow temperature refrigerant stored in a refrigerant storage tank or a general refrigerator using a refrigeration cycle to the evaporator 23 using a general feed pump.

The super conductive rotor 20 is constructed in a structure in which a plurality of super conductive coils 22 fixedly stacked on the outer circumference of a rotary shaft 21, and the evaporator 23 is formed in the rotary shaft 21 for cooling the super conductive rotor 20 by the evaporation of a liquid-phase ultralow temperature refrigerant, whereby the liquid-phase ultralow temperature refrigerant is introduced and evaporated in the evaporator 23 to absorb heat from the super conductive rotor 20 and thus cool the super conductive rotor 20.

The refrigerant introduction pipe 30 is coupled between the refrigeration system 10 and the evaporator 23 of the super conductive rotor 20. Opposite ends of the refrigerant introduction pipe 30 are open to supply a liquid-phase ultralow temperature refrigerant discharged from the refrigeration system 10 to the evaporator 23. The refrigerant introduction pipe 30 is integrally coupled to the rotary shaft 21 for allowing the liquid-phase ultralow temperature refrigerant to be introduced into the evaporator 23 through the inside thereof while rotating with the rotary shaft 21 when the rotary shaft 21 rotates.

The refrigerant withdrawal pipe 40 withdraws a gas-phase ultralow temperature refrigerant obtained by the evaporation of the liquid-phase ultralow temperature refrigerant introduced into the evaporator 23 to the refrigeration system 10. In the same manner as the refrigerant introduction pipe 30, opposite ends of the refrigerant withdrawal pipe 40 are open, such that one end of the refrigerant withdrawal pipe 40 communicates with the evaporator 23 and the other end of the refrigerant withdrawal pipe 40 communicates with the refrigeration system 10, to achieve smooth withdrawal of the gas-phase ultralow temperature refrigerant.

The vacuum housing 50 thermally insulates a liquid-phase ultralow temperature refrigerant flowing along the refrigerant introduction pipe 30 and a gas-phase ultralow temperature refrigerant flowing along the refrigerant withdrawal pipe 40 to minimize the loss of cool air. The vacuum housing 50 is configured to integrally surround the refrigerant introduction pipe 30 and the refrigerant withdrawal pipe 40. Inside the vacuum housing 50 is formed a vacuum heat insulation space 51 which is maintained in a vacuum state. The refrigerant introduction pipe 30 and the refrigerant withdrawal pipe 40 are disposed in the vacuum heat insulation space 51.

Since the refrigerant introduction pipe 30 and the refrigerant withdrawal pipe 40 are separately formed, as described above, it is possible to pressurize a liquid-phase refrigerant and forcibly introduce the liquid-phase refrigerant into the evaporator 23 and to forcibly withdraw a gas-phase refrigerant from the evaporator 23, thereby achieving more rapid and smooth circulation of the refrigerant and thus maximizing the cooling efficiency, unlike the conventional natural circulation type refrigerant supply apparatus in which a liquid-phase refrigerant and a gas-phase refrigerant flow along a single pipe by virtue of gravity.

Also, it is preferable for the refrigerant introduction pipe 30 to be disposed at the same center of rotation as the super conductive rotor 20 such that the flow velocity of the liquid-phase refrigerant introduced into the evaporator 23 is prevented from being lowered by a centrifugal force. It is also preferable for the refrigerant withdrawal pipe 40 to include a plurality of refrigerant withdrawal pipes disposed at the outer circumference of the refrigerant introduction pipe 30 at predetermined intervals to achieve more smooth withdrawal of the gas-phase refrigerant.

Between the refrigerant withdrawal pipes 40 and the refrigeration system 10 may be formed a refrigerant withdrawal chamber 41, which is disposed inside the vacuum housing 50 for temporarily storing the gas-phase refrigerant withdrawn through the refrigerant withdrawal pipes 40 and allowing the temporarily stored gas-phase refrigerant to be introduced into the refrigeration system 10 through a single channel. By the provision of the refrigerant withdrawal chamber 41, it is possible to more easily and conveniently achieve the coupling between the rotary type ultralow temperature refrigerant supply apparatus and the refrigeration system 10 and, at the same time, to achieve smooth withdrawal of the gas-phase refrigerant.

That is, the refrigerant withdrawal pipes 40 are directly coupled with the refrigerant withdrawal chamber 41, therefore, the gas-phase ultralow temperature refrigerant withdrawn through the withdrawal pipes 40 meets in the refrigerant withdrawal chamber 41 and is temporarily stored in the refrigerant withdrawal chamber 41. As a result, the gas-phase ultralow temperature refrigerant is more smoothly withdrawn into the refrigerant system 10.

In addition, the withdrawal chamber 41 includes a discharge pipe 42 provided at the lower part thereof. Since the discharge pipe 42 is provided at the lower part of the withdrawal chamber 41, even if a level of the gas-phase ultralow temperature refrigerant stored in the withdrawal chamber 41 is low, the gas-phase ultralow temperature refrigerant can be smoothly discharged to the refrigerant system 10.

In addition, a connection pipe 11, having a diameter corresponding to that of the refrigerant introduction pipe 30, may be fixedly connected to the refrigeration system for discharging a liquid-phase ultralow temperature refrigerant from the refrigeration system. Between the refrigerant introduction pipe 30 and the connection pipe 11 may be mounted a common mechanical seal 31 for preventing the leakage of the liquid-phase refrigerant when the connection pipe 11 is coupled to the refrigerant introduction pipe 30, which is rotatable with the super conductive rotor 20. Consequently, it is possible to achieve smooth rotation of the refrigerant introduction pipe 30 and, at the same time, to achieve stable flow of the refrigerant.

Also, among the stationary vacuum housing 50, the rotatable refrigerant introduction pipe 30, and the rotatable refrigerant withdrawal pipe 40 may be coupled a common magnetic fluid seal 52 to stably maintain a vacuum state and, at the same time, to prevent the leakage of the refrigerant, thereby maximizing a vacuum heat insulation effect and, at the same time, achieving stable cooling.

As is apparent from the above description, the rotary type ultralow temperature refrigerant supply apparatus according to the present invention is constructed in a structure in which the refrigerant introduction pipe and the refrigerant withdrawal pipe, which are separated from each other, are disposed inside the vacuum housing for individually circulating a liquid-phase ultralow temperature refrigerant supplied from the refrigeration system and a gas-phase ultralow temperature refrigerant obtained through the evaporation of the liquid-phase ultralow temperature refrigerant by the evaporator. Consequently, the present invention has the effect of achieving forcible circulation of the refrigerant, thereby achieving more rapid and smooth cooling.

Also, the refrigerant introduction pipe is disposed at the same center of rotation as the super conductive rotor to prevent the liquid-phase ultralow temperature refrigerant from concentrating at one side by a centrifugal force during the rotation of the super conductive rotor and thus minimize the lowering in flow velocity of the liquid-phase ultralow temperature refrigerant. Consequently, the present invention has the effect of achieving smooth introduction of the liquid-phase ultralow temperature refrigerant into the evaporator formed at the center of the super conductive rotor, thereby further improving the cooling efficiency.

Also, the rotary type ultralow temperature refrigerant supply apparatus according to the present invention is constructed to further include a plurality of the refrigerant withdrawal pipes and the refrigerant withdrawal chamber such that the gas-phase ultralow temperature refrigerant obtained through the evaporation of the liquid-phase ultralow temperature refrigerant in the evaporator is rapidly discharged from the evaporator, and, at the same time, the gas-phase ultralow temperature refrigerant discharged from the evaporator is smoothly withdrawn to the refrigeration system. Consequently, the present invention has the effect of further improving the heat exchange efficiency.

Furthermore, the rotary type ultralow temperature refrigerant supply apparatus according to the present invention is constructed to further include the mechanical seal and the magnetic fluid seal for preventing the leakage of the refrigerant between the rotatable refrigerant introduction pipe and the stationary refrigeration system. Consequently, the present invention has the effect of preventing the occurrence of air pollution and the lowering of the cooling performance due to the leakage of the refrigerant.

Although the exemplary embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A rotary type ultralow temperature refrigerant supply apparatus, comprising:
   a rotatable refrigerant introduction pipe to supply a liquid-phase ultralow temperature refrigerant supplied from a refrigerant system to a super conductive rotor;
   a plurality of refrigerant withdrawal pipes disposed spaced apart from the rotatable refrigerant introduction pipe to withdraw a gas-phase ultralow temperature refrigerant obtained through the super conductive rotor and to guide the gas-phase ultralow temperature refrigerant to the refrigerant system;
   a vacuum housing fixedly disposed between an outside the superconductive rotor and the refrigerant system, and having a vacuum heat insulation space defined therein;
   a refrigerant withdrawal chamber disposed inside the vacuum housing to temporarily store the gas-phase ultralow temperature refrigerant withdrawn through the plurality of refrigerant withdrawal pipes;
   a fixed connection pipe having a first end fixedly connected to the refrigerant system and a second end connected to an end of the rotatable refrigerant introduction pipe, so as to connect the rotatable refrigerant introduction pipe with the refrigerant system; and a mechanical seal disposed inside the refrigerant withdrawal chamber, sealing the second end of the fixed connection pipe to the end of the rotatable refrigerant introduction pipe in a location inside the refrigerant withdrawal chamber, wherein the plurality of refrigerant withdrawal pipes are disposed around the refrigerant introduction pipe in the form of a circle at predetermined intervals, so that the plurality of refrigerant withdrawal pipes revolve around the rotatable refrigerant introduction pipe.

2. The rotary type ultralow temperature refrigerant supply apparatus according to claim 1, wherein the refrigerant introduction pipe is disposed at the same center of rotation as the super conductive rotor.

3. The rotary type ultralow temperature refrigerant supply apparatus according to claim 1, further comprising a magnetic fluid seal configured to achieve sealing between the super conductive rotor and the stationary vacuum housing.

4. The rotary type ultralow temperature refrigerant supply apparatus according to claim 2, further comprising a magnetic fluid configured to achieve sealing between the super conductive rotor and the stationary vacuum housing.

5. The rotary type ultralow temperature refrigerant supply apparatus according to claim 1, wherein at least one of the plurality of refrigerant withdrawal pipes is separated from the refrigerant introduction pipe by at least a portion of the vacuum heat insulation space.

6. The rotary ultralow temperature refrigerant supply apparatus according to claim 1, wherein the plurality of refrigerant withdrawal pipes is separated from the refrigerant introduction pipe by at least a portion of the vacuum heat insulation space.

7. A rotary type ultralow temperature refrigerant supply apparatus comprising:
a rotatable refrigerant introduction pipe to supply a liquid-phase ultralow temperature refrigerant supplied from a refrigerant system to a superconductive rotor;
at least one refrigerant withdrawal pipe disposed spaced apart from the refrigerant introduction pipe to withdraw a gas-phase ultralow temperature refrigerant obtained through the superconductive rotor and to guide the gas-phase ultralow temperature refrigerant to the refrigerant system;
a vacuum housing fixedly disposed between an outside the superconductive rotor and the refrigerant system, and having a vacuum heat insulation space defined therein;
a refrigerant withdrawal chamber disposed inside the vacuum housing to temporarily store the gas-phase ultralow temperature refrigerant withdrawn through the at least one refrigerant withdrawal pipe;
a fixed connection pipe having a first end fixedly connected to the refrigerant system and a second end connected to an end of the rotatable refrigerant introduction pipe, so as to connect the rotatable refrigerant introduction pipe with the refrigerant system; and
a mechanical seal disposed inside the refrigerant withdrawal chamber, sealing the second end of the fixed connection pipe to the end of the rotatable refrigerant introduction pipe in a location inside the refrigerant withdrawal chamber.

8. The rotary type ultralow temperature refrigerant supply apparatus according to claim 7, wherein the refrigerant introduction pipe is disposed at the same center of rotation as the super conductive rotor.

9. The rotary type ultralow temperature refrigerant supply apparatus according to claim 7, wherein the at least one refrigerant withdrawal pipe is separated from the refrigerant introduction pipe by at least a portion of the vacuum heat insulation space.

10. The rotary type ultralow temperature refrigerant supply apparatus according to claim 7, further comprising a magnetic fluid seal configured to achieve sealing, between the super conductive rotor and the stationary vacuum housing.

11. The rotary type ultralow temperature refrigerant supply apparatus according to claim 8, further comprising a magnetic fluid seal configured to achieve sealing between the super conductive rotor and the stationary vacuum housing.

12. The rotary type ultralow temperature refrigerant supply apparatus according to claim 1, wherein the refrigerant withdrawal chamber is directly coupled with the plurality of refrigerant withdrawal pipes, such that the gas-phase ultralow temperature refrigerants withdrawn through the plurality of refrigerant withdrawal pipes meet in the refrigerant withdrawal chamber.

13. The rotary type ultralow temperature refrigerant supply apparatus according to claim 1, further comprising a refrigerant discharge pipe disposed at the lower part of the refrigerant withdrawal chamber, such that the gas-phase ultralow temperature refrigerant stored in the withdrawal chamber is discharged to the refrigerant system.

14. The rotary type ultralow temperature refrigerant supply apparatus according to claim 7, wherein the refrigerant withdrawal chamber is directly coupled with the at least one refrigerant withdrawal pipe, such that the gas-phase ultralow temperature refrigerants withdrawn through the at least one refrigerant withdrawal pipe meets in the refrigerant withdrawal chamber.

15. The rotary type ultralow temperature refrigerant supply apparatus according to claim 7, wherein the refrigerant withdrawal chamber is directly coupled with the at least one refrigerant withdrawal pipe, such that the gas-phase ultralow temperature refrigerants withdrawn through the at least one refrigerant withdrawal pipe meet in the refrigerant withdrawal chamber.

16. The rotary type ultralow temperature refrigerant supply apparatus according to claim 1, wherein the fixed connection pipe has a same diameter as the rotatable refrigerant introduction pipe.

* * * * *